United States Patent
Fischer et al.

(10) Patent No.: US 9,688,037 B2
(45) Date of Patent: Jun. 27, 2017

(54) TYRE LAYER APPLICATION ASSEMBLY AND METHOD

(71) Applicant: VMI HOLLAND B.V., Epe (NL)

(72) Inventors: Florian Fischer, Ebersberg (DE); Cornelis Wouteres Janszen, Harderwijk (NL)

(73) Assignee: VMI HOLLAND B.V., Epe (NL)

( * ) Notice: Subject to any disclaimer, the term of this patent is extended or adjusted under 35 U.S.C. 154(b) by 221 days.

(21) Appl. No.: 14/398,190

(22) PCT Filed: Oct. 28, 2013

(86) PCT No.: PCT/NL2013/050754
§ 371 (c)(1),
(2) Date: Oct. 31, 2014

(87) PCT Pub. No.: WO2014/073953
PCT Pub. Date: May 15, 2014

(65) Prior Publication Data
US 2015/0083301 A1    Mar. 26, 2015

(30) Foreign Application Priority Data
Nov. 7, 2012 (NL) ....................................... 2009769

(51) Int. Cl.
*B32B 41/00* (2006.01)
*B29D 30/16* (2006.01)
(Continued)

(52) U.S. Cl.
CPC ......... *B29D 30/16* (2013.01); *B29D 30/0061* (2013.01); *B29D 30/1607* (2013.01);
(Continued)

(58) Field of Classification Search
CPC .... B29D 30/16; B29D 30/0061; B29D 30/58; B29D 30/1607; B29D 30/3007;
(Continued)

(56) References Cited

U.S. PATENT DOCUMENTS

| 5,582,664 A | 12/1996 | Sergel et al. |
| 5,935,377 A | 8/1999 | Sergel et al. |

(Continued)

FOREIGN PATENT DOCUMENTS

| DE | 27 40 609 A1 | 3/1979 |
| DE | 34 21 831 A1 | 12/1985 |
| WO | 2009/131451 A1 | 10/2009 |

OTHER PUBLICATIONS

International Search Report, dated Jan. 21, 2014, from corresponding PCT application.

*Primary Examiner* — Michael N Orlando
*Assistant Examiner* — Joshel Rivera
(74) *Attorney, Agent, or Firm* — Young & Thompson

(57) ABSTRACT

A tire layer application assembly and a method for applying a tire layer around a substantially circular circumferential surface of an object. The assembly is provided with a drive which, during application, is coupled to the object for driving the object in a driven rotation about a concentric axis of rotation with respect to the circumferential surface, wherein the assembly includes a tracking device which, during application, is arranged to be fixed to a part of the tire layer that is applied to the circumferential surface, wherein the tracking device is rotatable in a tracking rotation about the axis of rotation of the object, independent of the driven rotation of the object about the same axis of rotation.

27 Claims, 9 Drawing Sheets

(51) Int. Cl.
  *B29D 30/30* (2006.01)
  *B29D 30/58* (2006.01)
  *B29D 30/00* (2006.01)
  *B29D 30/26* (2006.01)
  *B29D 30/44* (2006.01)

(52) U.S. Cl.
  CPC ......... *B29D 30/3007* (2013.01); *B29D 30/58* (2013.01); *B29D 2030/0033* (2013.01); *B29D 2030/0038* (2013.01); *B29D 2030/1685* (2013.01); *B29D 2030/2671* (2013.01); *B29D 2030/3085* (2013.01); *B29D 2030/4425* (2013.01); *B29D 2030/4437* (2013.01)

(58) Field of Classification Search
  CPC .... B29D 2030/0033; B29D 2030/0038; B29D 2030/4437; B29D 2030/4425; B29D 2030/3085; B29D 2030/2671; B29D 2030/1685
  USPC ... 156/64, 406.4, 406.6, 130, 133, 134, 111, 156/163, 304.5, 394.1, 405.1, 507
  See application file for complete search history.

(56) References Cited

U.S. PATENT DOCUMENTS 6,758,931 B1 * 7/2004 Daugherty ............ B29D 30/54
  156/128.1
2002/0017357 A1   2/2002 Fischer

* cited by examiner

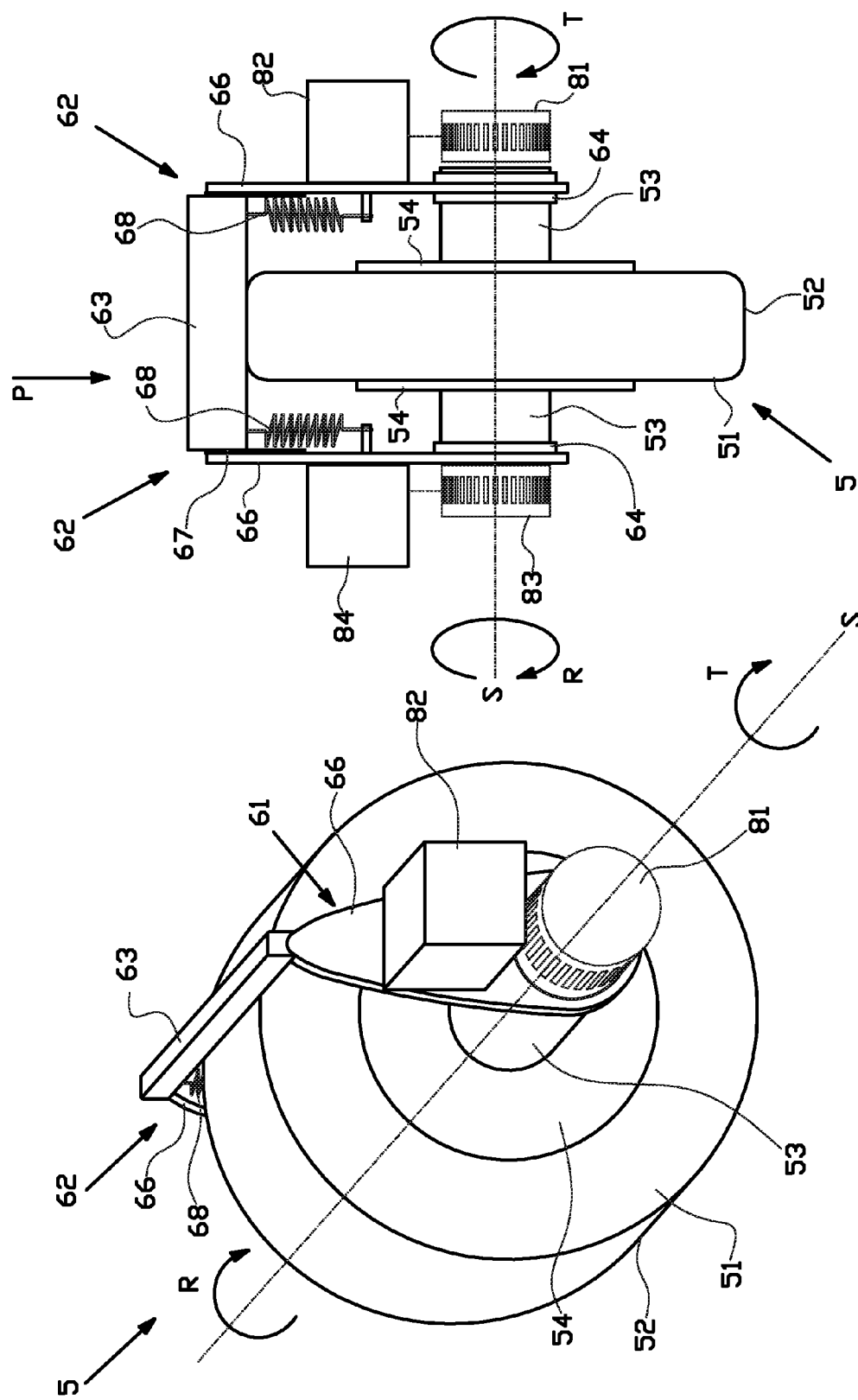

TYRE LAYER APPLICATION ASSEMBLY AND METHOD

BACKGROUND

The invention relates to a tyre layer application assembly and a method for applying a tyre layer around a circumferential surface of a drum or a tyre.

A method for applying a new tread around a buffed circumferential surface of an existing tyre, also known as retreading, involves the tagging of a leading end of the tread to the circumferential surface during the retreading. The circumferential surface of the tyre is subsequently rotated to wind the rest of the tread around the tyre until the trailing end meets the leading end to form a splice. Finally, the splice is stitched by a stitch roller.

During winding, the tread is subjected to a pulling force to stretch the tread so that it matches the circumferential length of the circumferential surface of the tyre. The pulling force can however cause the tagged leading end of the tread to slip over the circumferential surface of the tyre. Once the leading end of the tread has slipped, its position becomes undefined and an accurate splice can no longer be ensured. Additionally, the application of the tread on the tyre inevitably causes deformation of the circumferential surface of the tyre and in some cases even deformation of the hub or rim of the tyre. As a result, the circumferential length and shape of the tyre becomes undefined and the tread cannot be accurately applied around its circumferential surface.

It is an object of the present invention to provide a tyre layer application assembly and a method for applying a tyre layer around a circumferential surface of a drum or a tyre, wherein the accuracy of the application of the tyre layer is increased.

SUMMARY OF THE INVENTION

According to a first aspect, the invention provides a tyre layer application assembly for applying a tyre layer around a substantially circular circumferential surface of an object, wherein the assembly is provided with a drive which, during application, is coupled to the object for driving the object in a driven rotation about a concentric axis of rotation with respect to said circumferential surface, wherein the assembly comprises a tracking device which, during application, is arranged to be fixed to a part of the tyre layer that is applied to the circumferential surface, wherein the tracking device is rotatable in a tracking rotation about the axis of rotation of the object, independent of the driven rotation of the object about the same axis of rotation.

The independent tracking rotation can be an accurate indicator for the actual angular displacement of the part of the tyre layer to which the tracking device is attached. Based on the tracking rotation, the application of the tyre layer can be more accurately controlled.

In an embodiment, in the event of an angular displacement of the part of the tyre layer to which the tracking device is fixed with respect to the circumferential surface of the object, the tracking device is independently rotatable about the axis of rotation of the object with respect to the driven rotation of the object about the same axis of rotation. Such angular displacement can be caused by slipping or backlash of the tyre layer over the circumferential surface. By tracking the tracking rotation, the displacement can be compensated for during application of the tyre layer.

In an embodiment the tracking device is jointly rotatable about the axis of rotation of the object with the part of the tyre layer to which it is fixed. Thus, the rotation of the tyre layer can be directly transferred onto the tracking device.

In an embodiment the tyre layer has a leading end which, during application, is the first part of the tyre layer to be applied to the circumferential surface, wherein the tracking device is fixed to the tyre layer at or near the leading end. By fixing the tracking device to the leading end, the angular displacement of the leading end of the tyre layer can be accurately traced.

In an embodiment the assembly comprises a calculation unit and a first measuring unit which is arranged for measuring the tracking rotation of the tracking device about the axis of rotation and for sending a measurement signal indicative of the tracking rotation to the calculation unit. The measurement signal indicative of the tracking rotation can be used to control the application of the tyre layer.

In an embodiment the assembly comprises a second measuring unit which is arranged for measuring the driven rotation of the object about the axis of rotation and for sending a measurement signal indicative of the driven rotation to the calculation unit. The measurement signal indicative of the driven rotation can be used to control the application of the tyre layer.

In an embodiment the calculation unit is connected to the drive and is arranged for calculating the difference between the tracking rotation and the driven rotation based on the measurement signals received from the measurement units, and for sending a control signal to the drive to rotate the object about the axis of rotation over approximately a full revolution plus the calculated difference. By compensating for the difference between the tracking rotation and the driven rotation, it can be ensured that the leading end and the trailing end of the tyre layer meet, so that they can be accurately spliced together.

In an embodiment the tyre layer has a trailing end which, during application, is the last part of the tyre layer which is to be applied to the circumferential surface, wherein the assembly is provided with a retaining device which holds or retains the trailing end during application. The retaining device can control the trailing end of the tyre layer and reduce uncontrolled movements or deformations of the tyre layer.

In an embodiment the tyre layer application assembly is arranged for controlling the displacement of the retaining device to control the displacement of trailing end during application, wherein the calculation unit is connected to the retaining device and is arranged for sending a control signal to the retaining device for controlling the trailing end displacement in a specific rate to the measurement signal indicative of the tracking rotation. Preferably the rate is approximately $1/360$ part of the length of the tyre layer per degree of the tracking rotation or pro rata to the remaining length of the tyre that is yet to be applied and the remaining tracking rotation that is yet to be made. In this manner, the tyre layer can be evenly distributed around the circumferential surface of the object. This even applies to the case in which the tyre layer length is shorter than the peripheral length of the circumferential surface of the object, in which case the tyre layer can be stretched accordingly. In this particular embodiment, the use of the measurement signal indicative of the driven rotation can increase the accuracy of the even distribution, as it allows for compensation of the actual angular displacement of the tyre layer with respect to the driven rotation of the object.

In an embodiment the tyre layer application assembly is arranged for controlling the displacement of the retaining device to control the displacement of trailing end during application, wherein the calculation unit is connected to the retaining device and is arranged for sending a control signal to the retaining device for controlling the trailing end displacement in a specific rate to the measurement signal indicative of the driven rotation. Preferably, the rate is approximately 1/360 part of the length of the tyre layer per degree of the driven rotation or pro rata to the remaining length of the tyre that is yet to be applied and the remaining driven rotation that is yet to be made. In this manner, it the tyre layer can be evenly distributed around the circumferential surface of the object. This even applies to the case in which the tyre layer length is shorter than the peripheral length of the circumferential surface of the object, in which case the tyre layer can be stretched accordingly.

In an embodiment the assembly comprises a shaft onto which the object is rotatably supported at its axis of rotation and a bearing for rotatably supporting the tracking device with respect to the shaft about the axis of rotation of the object. The tracking device can be supported on the same shaft which supports the object.

In an embodiment the bearing rotatably couples the tracking device to the shaft. The bearings allow the tracking device to independently rotate with respect to the shaft and the object.

In an embodiment the bearing is concentric with respect to the shaft onto which the object is supported. The concentric arrangement of the bearing allows the tracking device to concentrically rotate about the same axis of rotation as the object.

In an embodiment the tracking device comprises at least one arm which is coupled to the bearing and extends radially outwards with respect to the circumferential surface of the object towards the tyre layer, wherein the tracking device is provided with a fixing body which is coupled to the arm at or near the circumferential surface, wherein the fixing body, during application, is arranged to be fixed to the tyre layer. The arm can bridge the distance between the bearings at one end of the tracking device and the fixing body at the circumferential surface of the object.

In an embodiment, considered in the rotational direction of the arm about the axis of rotation, the fixing body and the arm form a rigid unity. Thus, any angular displacement of the fixing body can be directly transmitted onto the arm. As a result, the angular displacement of the arm provides an accurate indicator of the angular displacement of the fixing body, and thus of the tyre layer to which the fixing body is fixed.

In an embodiment the fixing body is coupled to the arm via guide that allows for translation of the fixing body in the radial direction with respect to the arm, wherein the tracking device is provided with a biasing member which biases the fixing body to move in a radially inward direction with respect to the axis of rotation towards the circumferential surface of the object. The biased fixing body can be placed into pressing abutment with the tyre layer.

In an embodiment the tracking device is arranged to be fixed to the tyre layer by clamping, tagging, adhering and/or gripping. In this manner, a reliable fixation between the tracking device and the tyre layer can be achieved.

In an embodiment the fixing body is provided with a clipping bar, wherein, during application, the clipping bar is arranged to be pressed against the tyre layer to clamp the tyre layer on the circumferential surface. The clipping bar can hold the part of the tyre layer to which it is fixed against the circumferential surface of the object, to reduce the occurrence of slipping of backlash.

In an embodiment the object is an empty drum, a drum with one or more other tyre layers already applied to it or a tyre. The drum can be used to build-up a new green tyre. The tyre can be an existing, worn tyre which is buffed and ready to be retreaded.

In an embodiment the circumferential surface is formed by the circumferential surface of the empty drum, the circumferential surface of the other tyre layers applied to the drum or the circumferential surface of the tyre, respectively.

In an embodiment the circumferential surface of the tyre is buffed or stripped to expose underlying tyre layers, wherein, preferably, the tyre layer to be applied to the circumferential surface is a tread. In this manner, existing, worn tyres can be accurately retreaded.

According to a second aspect, the invention provides a method for applying a tyre layer around a substantially circular circumferential surface of an object, wherein the method comprises the steps of driving the object in driven rotation about an axis of rotation, applying a part of the tyre layer to the circumferential surface of the object, fixing a tracking device to the part of the tyre layer that is applied to the object, rotating the tracking device with the part of the tyre layer to which it is fixed in a tracking rotation about the axis of rotation of the object, independent of the driven rotation of the object about the same axis of rotation.

The independent tracking rotation can be an accurate indicator for the actual angular displacement of the part of the tyre layer to which the tracking device is attached. Based on the tracking rotation, the application of the tyre layer can be more accurately controlled.

In an embodiment, in the event of an angular displacement of the part of the tyre layer to which the tracking device is fixed with respect to the circumferential surface of the object, the tracking rotation is independent of the driven rotation. Such angular displacement can be caused by slipping or backlash of the tyre layer over the circumferential surface. By tracking the tracking rotation, the displacement can be compensated for during application of the tyre layer.

In an embodiment the tracking device is jointly rotated about the axis of rotation of the object with the part of the tyre layer to which it is fixed. Thus, the rotation of the tyre layer can be directly transferred onto the tracking device.

In an embodiment the tracking rotation is continuously measured during the application of the tyre layer. This allows for continuous compensation or adjustment of the tyre application.

In an embodiment the method comprises the steps of measuring the tracking rotation and the driven rotation, calculating the difference between the tracking rotation and the driven rotation, and controlling the driven rotation to rotate the object about the axis of rotation over approximately a full revolution plus the calculated difference. By compensating for the difference between the tracking rotation and the driven rotation, it can be ensured that the leading end and the trailing end of the tyre layer meet, so that they can be accurately spliced together.

In an embodiment the tyre layer has a trailing end which, during application, is the last part of the tyre layer which is to be applied to the circumferential surface, wherein the method comprises the steps of measuring the tracking rotation and controlling the trailing end displacement in a specific rate to the measured tracking rotation. Preferably, the rate is approximately 1/360 part of the length of the tyre layer per degree of the tracking rotation or pro rata to the remaining length of the tyre layer that is yet to be applied and the remaining tracking rotation that is yet to be made. In this manner, the tyre layer can be evenly distributed around the circumferential surface of the object. This even applies to the case in which the tyre layer length is shorter than the peripheral length of the circumferential surface of the object, in which case the tyre layer can be stretched accordingly. In this particular embodiment, the use of the measurement signal indicative of the driven rotation can increase the accuracy of the even distribution, as it allows for compensation of the actual angular displacement of the tyre layer with respect to the driven rotation of the object.

In an embodiment the tyre layer has a trailing end which, during application, is the last part of the tyre layer which is to be applied to the circumferential surface, wherein the method comprises the steps of measuring the driven rotation and controlling the trailing end displacement in a specific rate to the measured driven rotation. Preferably, the rate is approximately 1/360 part of the length of the tyre layer per degree of the driven rotation or pro rata to the remaining length of the tyre layer that is yet to be applied and the remaining driven rotation that is yet to be made. In this manner, the tyre layer can be evenly distributed around the circumferential surface of the object. This even applies to the case in which the tyre layer length is shorter than the peripheral length of the circumferential surface of the object, in which case the tyre layer can be stretched accordingly.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 9 shows an isometric view of the object according to FIGS. 1-8 and parts of the tyre layer application assembly associated with said object; and FIG. 10 shows a front view of the object and the parts of the application assembly according to FIG. 9.

DETAILED DESCRIPTION OF THE INVENTION

Figure 1:
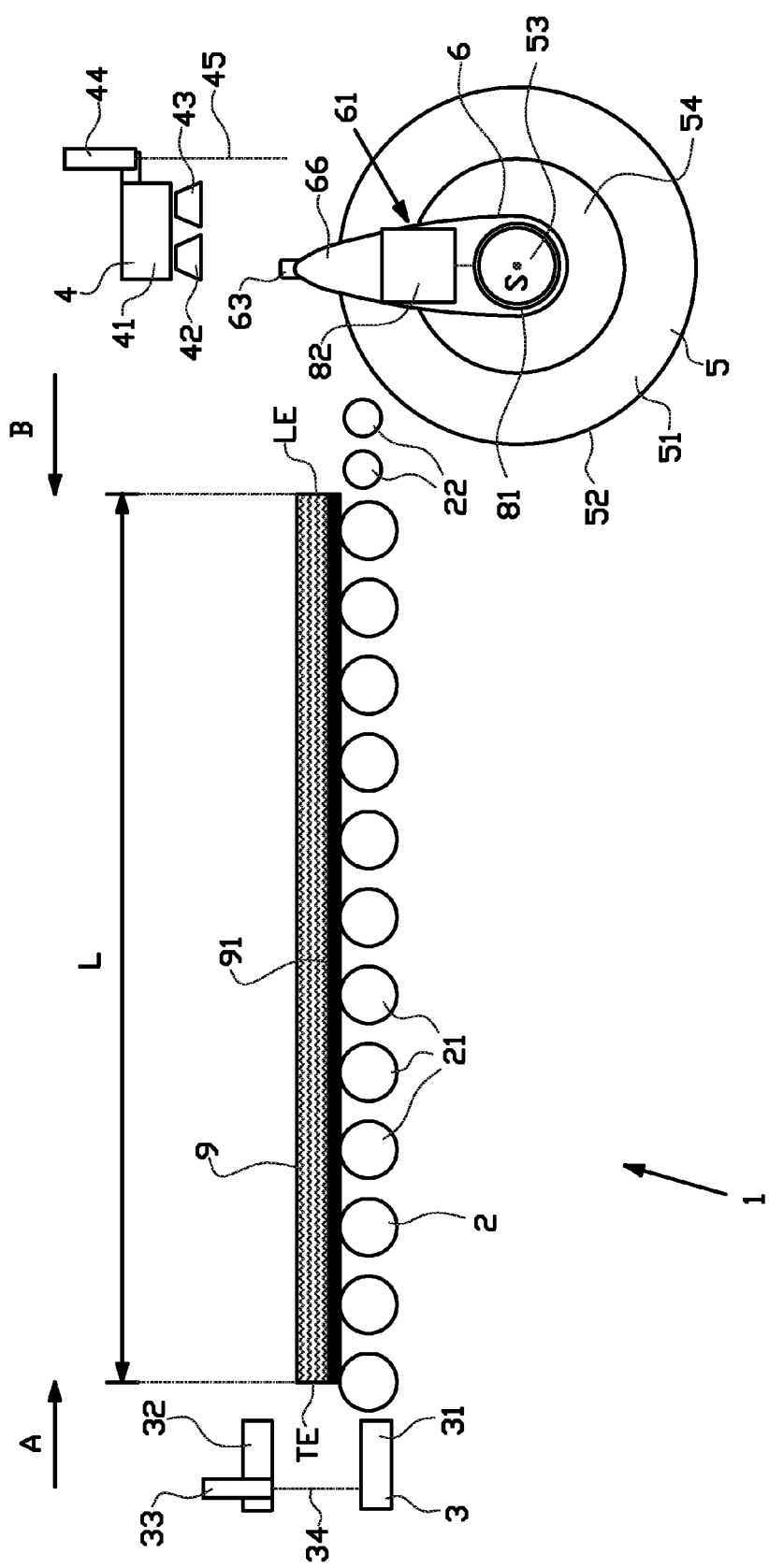
FIGS. 1-8 show a tyre layer application assembly in side view and the steps of a method for applying a tyre layer around a substantially circular circumferential surface of an object, according to a first embodiment of the invention.

FIGS. 1-8 show a tyre layer application assembly 1 for applying a tyre layer 9 around an object 5, according to an exemplary embodiment of the invention. The tyre layer application assembly 1 comprises a conveyor 2 for supporting the tyre layer 9, and a retaining device 3 and a pulling device 4 for transporting the tyre layer 9 over the conveyor 2 towards the object 5. The tyre layer application assembly 1 is provided with a drum clamp 6 for pulling the tyre layer 9 around the object 5 in a manner which will be described hereafter.

As shown in FIGS. 1-8, the conveyor 2 of this exemplary embodiment is a roller type conveyor 2 with a plurality of rollers 21 which form a transport or support surface. At the downstream end of the conveyor 2, near the object 5, small rollers 22 are provided to provide a smooth and tangential transition from the conveyor 2 to the object 5.

The object 5 can be an empty drum or a drum with one or more other tyre layers already applied to it, in which case the tyre layer application assembly 1 is used to apply subsequent tyre layers 9 to build up and manufacture a new tyre. Alternatively, the object 5 can be an existing, buffed worn tyre, in which case the tyre layer application assembly 1 is used for retreading said buffed worn tyre. The object 5 has a substantially cylindrical body 51 with a substantially circular or circular, outer circumferential surface 52 onto which the tyre layer 9 is to be applied. The object 5 is concentrically supported on a shaft or axle 53, or one a rim or hub 54 supported on a shaft or axle 53. The shaft or axle 53 is operationally attached to a drive (not shown) for driving the object 5 in a driven rotation R about the axis of rotation S thereof.

In this exemplary embodiment, the tyre layer 9 is a tread layer 91 of unvulcanized rubber material. The tread layer 91 has been cut into a definite length L which is in the range of approximately 95 to 99 percent of the circumferential perimeter of the circumferential surface 52 of the object 5. The tyre layer 9 has a trailing end TE which is the last part of the tyre layer 9 to be applied to the object 5 and a leading end LE which is the first part of the tyre layer 9 to be applied to the object 5.

The retaining device 3 comprises a first, lower gripping member 31 and a second, upper gripping member 32 which can be moved towards each other for, in mutual cooperation, gripping or clamping the trailing end TE of the tyre layer 9. The retaining device 3 further comprises an optical detection unit 33 for optically registering or detecting the position of the trailing end TE of the tyre layer 9. In FIG. 1, a schematic optical detection line 34 is shown.

The pulling device 4 comprises an attachment member 41 with two attachment units 42, 43. The attachment units 42, 43 are arranged for tagging, grabbing or attaching through suction onto the leading end LE of the tyre layer 9. The pulling device 4 further comprises an optical detection unit 44 for optically registering or detecting the position of the leading end LE of the tyre layer 9. In FIG. 1, a schematic optical detection line 45 is shown.

The drum clamp 6 can be a fixed drum clamp 6 which is rotation fixedly coupled to the object 5. The drum clamp 6 will then move jointly with the object 5. However, in the exemplary embodiment as shown in FIGS. 1-8, the drum clamp 6 is formed as a tracking device 6 which is independently rotatable with respect to the object 5 about the axis of rotation S of the object 5 in a manner which will be described hereafter.

As shown in more detail in FIGS. 9 and 10, the tracking device 6 comprises a first arm 61 and a second arm 62, one extending on each side or sidewall of the object 5. The arms 61, 62 are concentrically coupled, via bearings 64, to the object 5 or to the axle 53 on which the object 5 is supported. The bearings 64 allow for an independent tracking rotation T of the tracking device 6 with respect to the driven rotation R of the object 5. The arms 61, 62 extend radially outwards with respect to the axis of rotation S of the object 5 towards the circumferential surface 52 of the object 5.

At the circumferential surface 52 of the object 5, the tracking device 6 is provided with a fixing body 63 supported by and extending between the distal ends of the arms 61, 62. The fixing body 63 is arranged to be fixed by means of clamping, tagging, adhering and/or gripping to an already applied part of the tyre layer 9 at or near the leading end LE thereof. Considered in the direction of the tracking rotation R, the fixing body 63 and the arms 61, 62 form a rigid unity. Thus, any angular displacement of the tyre layer 9 about the axis of rotation S of the object 5 is directly transferred into a tracking rotation T of the fixing body 63 and the arms 61, 62 about the same axis of rotation S. As a result, the fixing body 63 and the part of the tyre layer 9 to which it is fixed jointly rotate about the axis of rotation S of the object 5.

Although the driven rotation R of the object 5 is imposed indirectly via the tyre layer 9 onto the tracking device 6, the tracking device 6 itself is not directly driven by any external drive and is independently rotatable with respect to the object 5. Thus, when the tyre layer 9 slips over the circumferential surface 52 of the object 5 and the angular displacement of the tyre layer 9 does not necessarily correspond anymore to the driven rotation R of the object 5, the tracking device 6 will jointly move with the part of the tyre layer 9 to which it is fixed, rather than move with the object 5. Thus, the tracking rotation T remains representative for the actual angular displacement of the part of the tyre layer 9 to which it is fixed.

In this exemplary embodiment, the fixing body 63 is a clipping bar 63. The clipping bar 63 is coupled to the arms 62, 63 via guides 67 that allow for translation of the clipping bar 63 in the radial direction of the object 5. The tracking device 6 is provided with biasing members in the form of springs 68 which bias the clipping bar 63 to move in a radially inward direction with respect to the axis of rotation S of the object 5 towards the circumferential surface 52 of the object 5. During application, the clipping bar 63 is biased by the springs to press in a pressing direction P against the tyre layer 9. As a result, the clipping bar 63, in cooperation with the object 5, clamps the tyre layer 9 onto the circumferential surface 52 of the object 5.

As shown in FIGS. 9 and 10, the tyre layer application assembly 1 is provided with a first measuring unit 81, 82 for measuring the tracking rotation T of the tracking device 6 about the axis of rotation S of the object 5. In this exemplary embodiment, the first measuring unit 81, 82 is in the form of an encoder having a pulse generator 81 and a pulse detector 82. The pulse generator of the first measuring unit 81, 82 can be any means which are detectable by the pulse detector 82, for example a visual or magnetic pattern that is applied to the tracking device 6 or, in this exemplary embodiment, a body with a visual pattern, which body is rotation fixedly coupled to the tracking device 6. The pulse detector 82 of the first measuring unit 81, 82 is operationally coupled to a calculation unit (not shown). The tracking rotation T of the tracking device 6 is imposed on the pulse generator 81, the pulses of which are detected by the pulse detector 82. The pulse detector 82 sends a first measurement signal indicative of the tracking rotation T of the tracking device 6 to the calculation unit (not shown).

As shown in FIG. 10, the tyre layer application assembly 1 is provided with a second measuring unit 83, 84 for measuring the driven rotation R of the tracking device 6 about the axis of rotation S of the object 5. Similarly to the first measuring unit 81, 82, the second measuring unit 83, 84 is in the form of an encoder, having a pulse generator 83 and a pulse detector 84 that is applied to or rotation fixedly coupled to the object 5. The pulse detector 84 of the second measuring unit 83, 84 is operationally coupled to the calculation unit. The driven rotation R of the object 5 is imposed on the pulse generator 83, the pulses of which are detected by the pulse detector 84. The pulse detector 84 sends a second measurement signal indicative of the driven rotation R of the object 5 to the calculation unit.

The method for applying the tyre layer 9 around the circumferential surface 52 of the object 5 with the use of the aforementioned tyre layer application assembly 1 will be described hereafter.

In FIG. 1, the situation is shown wherein the tyre layer 9 has been placed onto the roller conveyor 2. The tyre layer 9 has been previously cut into a length L in the range of approximately 95 to 99 percent of the circumferential perimeter of the circumferential surface 52 of the object 5. Knowing the length L of the tyre layer 9 prior to application thereof around the object 5 is of particular importance since the tyre layer 9 needs to be evenly stretched during application around the object 5 in order to make the leading end LE meet the trailing end TE, to be able to make a splice. In order to determine the length L of the tyre layer 9 prior to its application around the object 5, the first steps of the method are directed at detecting the trailing end TE and the leading end LE of the tyre layer 9.

Figure 2:
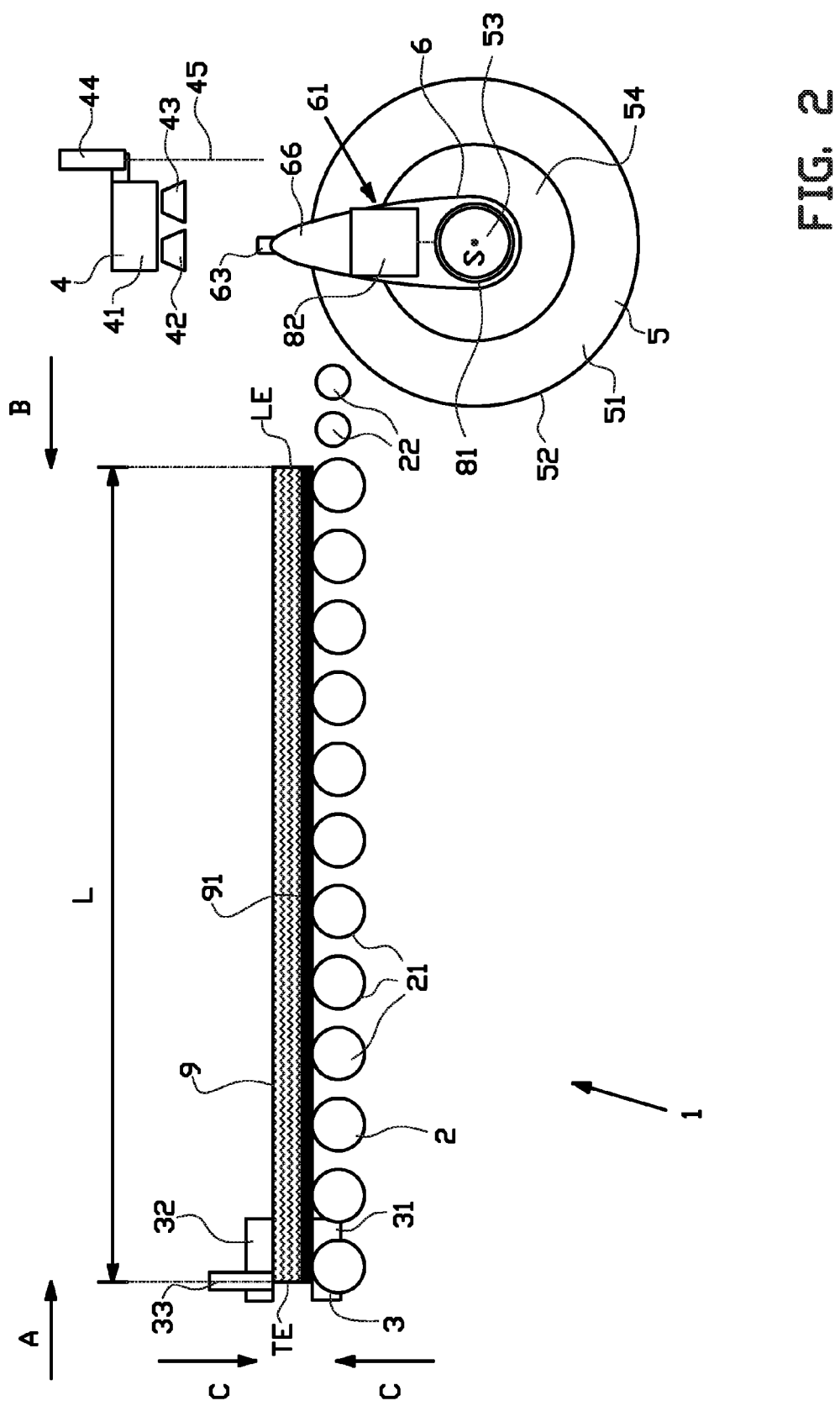

For the purpose of detecting the trailing end TE of the tyre layer 9, the retaining device 3 is moved in a downstream direction A from its initial position as shown in FIG. 1 into a position as shown in FIG. 2. In the situation as shown in FIG. 2, the optical detection unit 33 of the retaining device 3 has detected the position of the trailing end TE of the tyre layer 9 at the optical detection line 34. The movement of the retaining device 3 in the downstream direction A is halted and the gripping members 31, 32 of the retaining device 3 are moved towards each other in a clamping direction C to clamp the tyre layer 9 at or near the trailing end TE thereof. A measurement signal indicative of the position of the retaining device 3 is subsequently send to the calculation unit.

Figure 3:
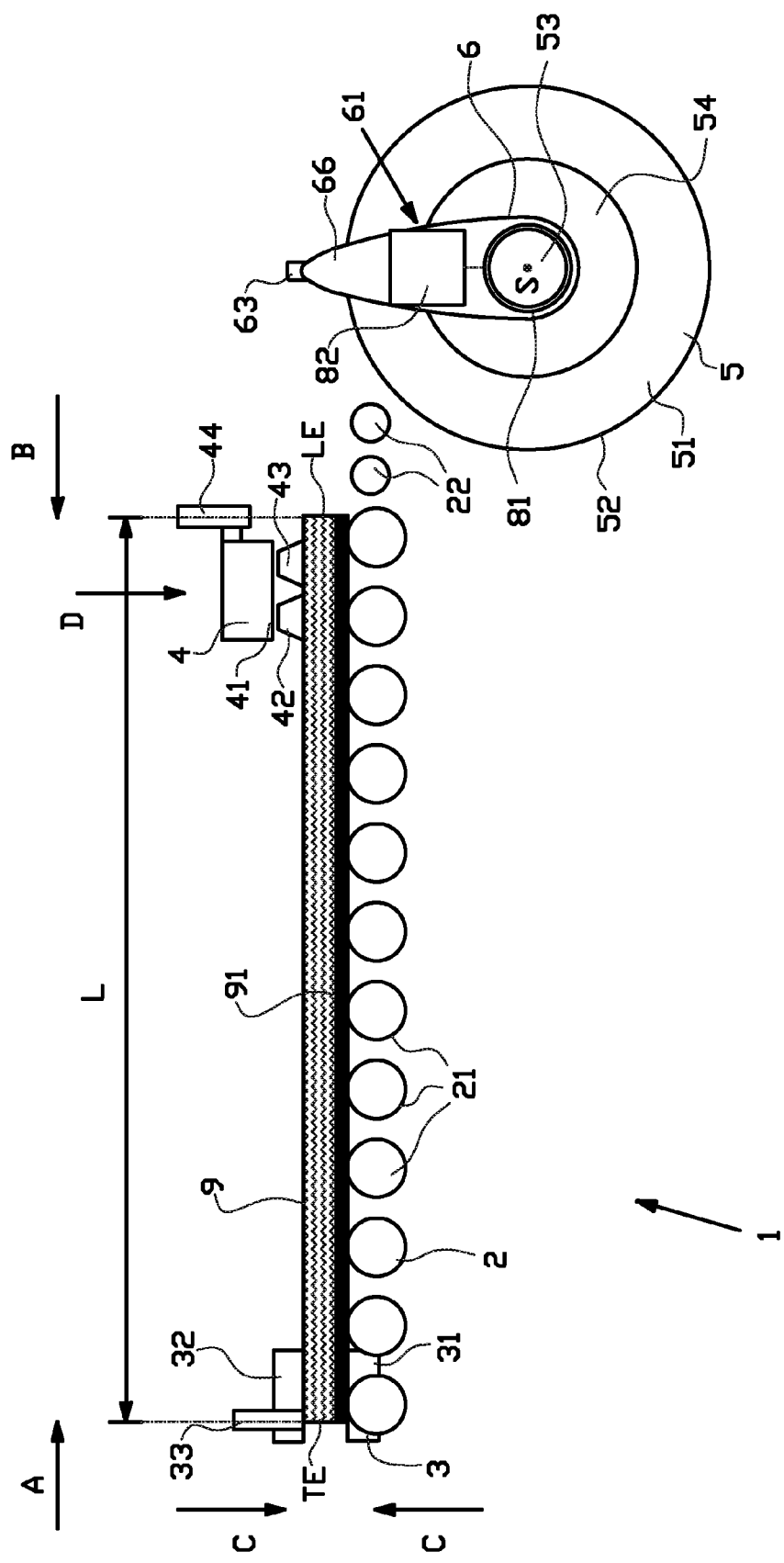

For the purpose of detecting the leading end LE of the tyre layer 9, the pulling device 4 is moved in an upstream direction B from its initial position as shown in FIGS. 1 and 2 into a position as shown in FIG. 3. In the situation as shown in FIG. 3, the optical detection unit 44 of the pulling device 4 has detected the position of the leading end LE of the tyre layer 9 at the optical detection line 45. The movement of the pulling device 4 in the upstream direction B is halted and the upper gripping member 41 of the pulling device 4 is moved downwards in the attachment direction D towards the tyre layer 9 to clamp the tyre layer 9 at or near the leading end LE thereof. A measurement signal indicative of the position of the pulling device 4 is subsequently send to the calculation unit.

From this point forward, the tyre layer 9 will be controlled throughout its transport towards and application around the object 5, in the sense that its trailing end TE and its leading end LE will be continuously held by the retaining device 3 and the pulling device 4 or the drum clamp 6, respectively. In this manner, the behaviour of the tyre layer 9 during the application thereof around the object 5 can be fully controlled and uncontrolled movements or deformations of the tyre layer 9 can be reduced or even eliminated.

Based on the measurement signals received from the retaining device 3 and the pulling device 4, the calculation unit can calculate the length L of the tyre layer 9 prior to the application of the tyre layer 9 around the object 5. Based on the calculated length L, a given length of the circumferential surface 52 of the object 5 and the difference between those two values, the required amount of stretching of the tyre layer 9 during the application of the tyre layer 9 around the object 5 can be predicted. This prediction about the required amount of stretching will be used later on in the method.

Figure 4:
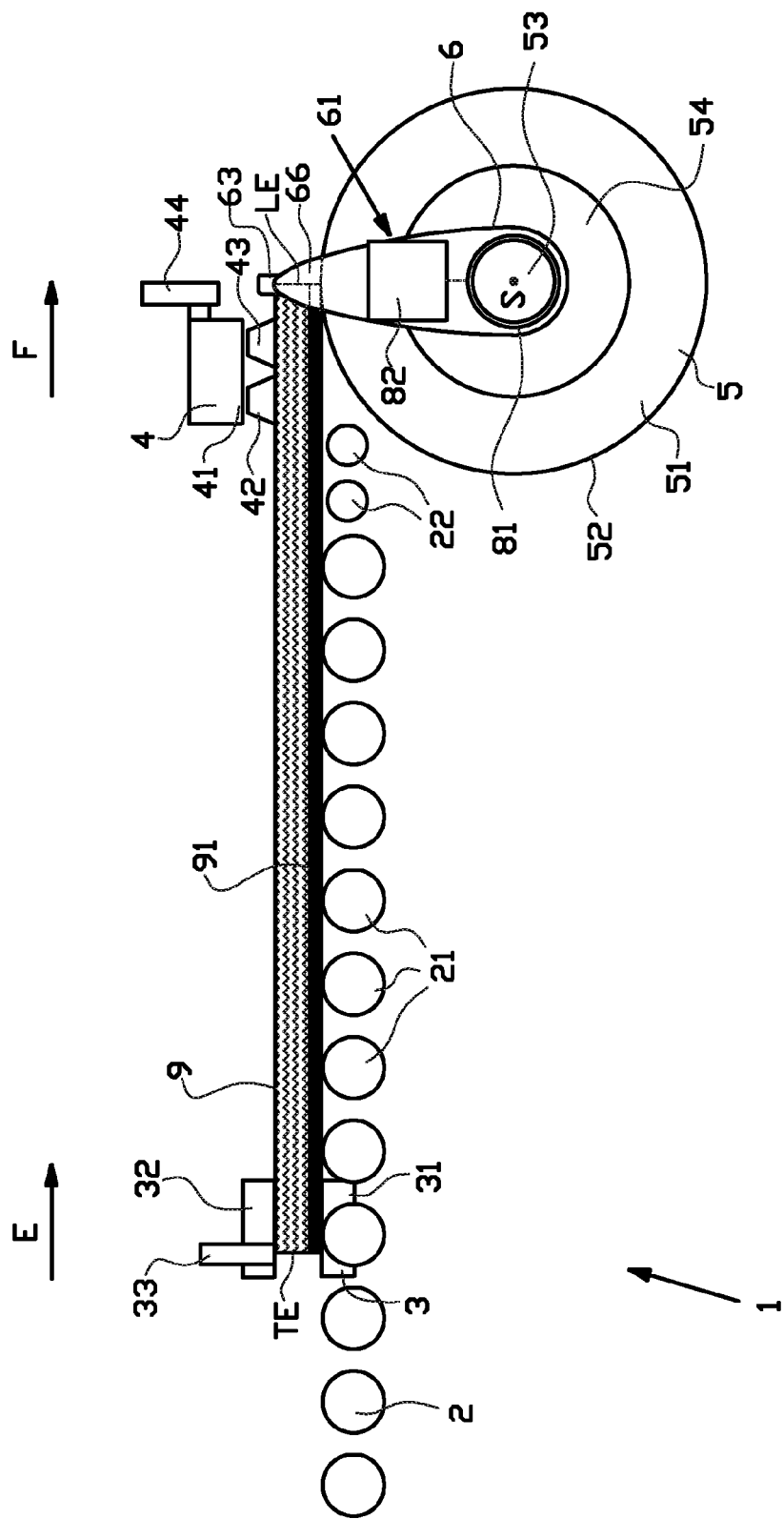

FIG. 4 shows the situation in which the retaining device 3 and the pulling device 4 are synchronously moved in respective transport directions E, F to move the tyre layer 9 by its clamped trailing end LE and leading end LE towards the object 5. During transport, the leading end LE of the tyre layer 9 is pulled by the pulling device 4, while the retaining device 3 follows in a synchronized manner. The leading end LE is subsequently transferred from the pulling device 4 to the drum clamp 6.

Figure 5:
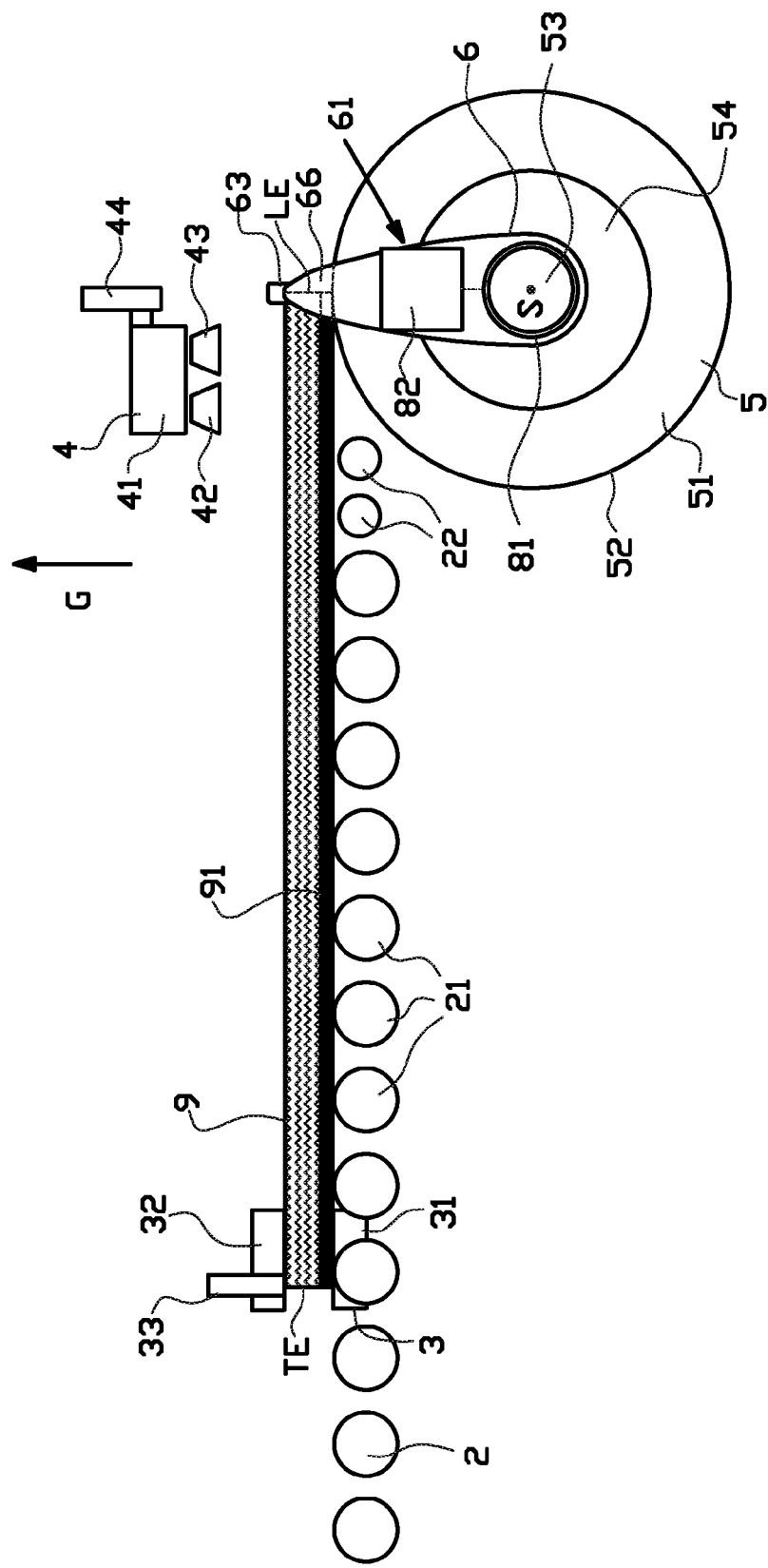

FIG. 5 shows the situation in which, after the transfer of the leading end LE of the tyre layer 9 from the pulling device 4 onto the drum clamp 6, the pulling device 4 is retracted in a retraction direction G to release the leading end LE of the tyre layer 9 from the pulling device 4. The tyre layer 9 is now clamped at its leading end LE by the drum clamp 6 and at its trailing end TE by the retaining device 3.

Figure 6:
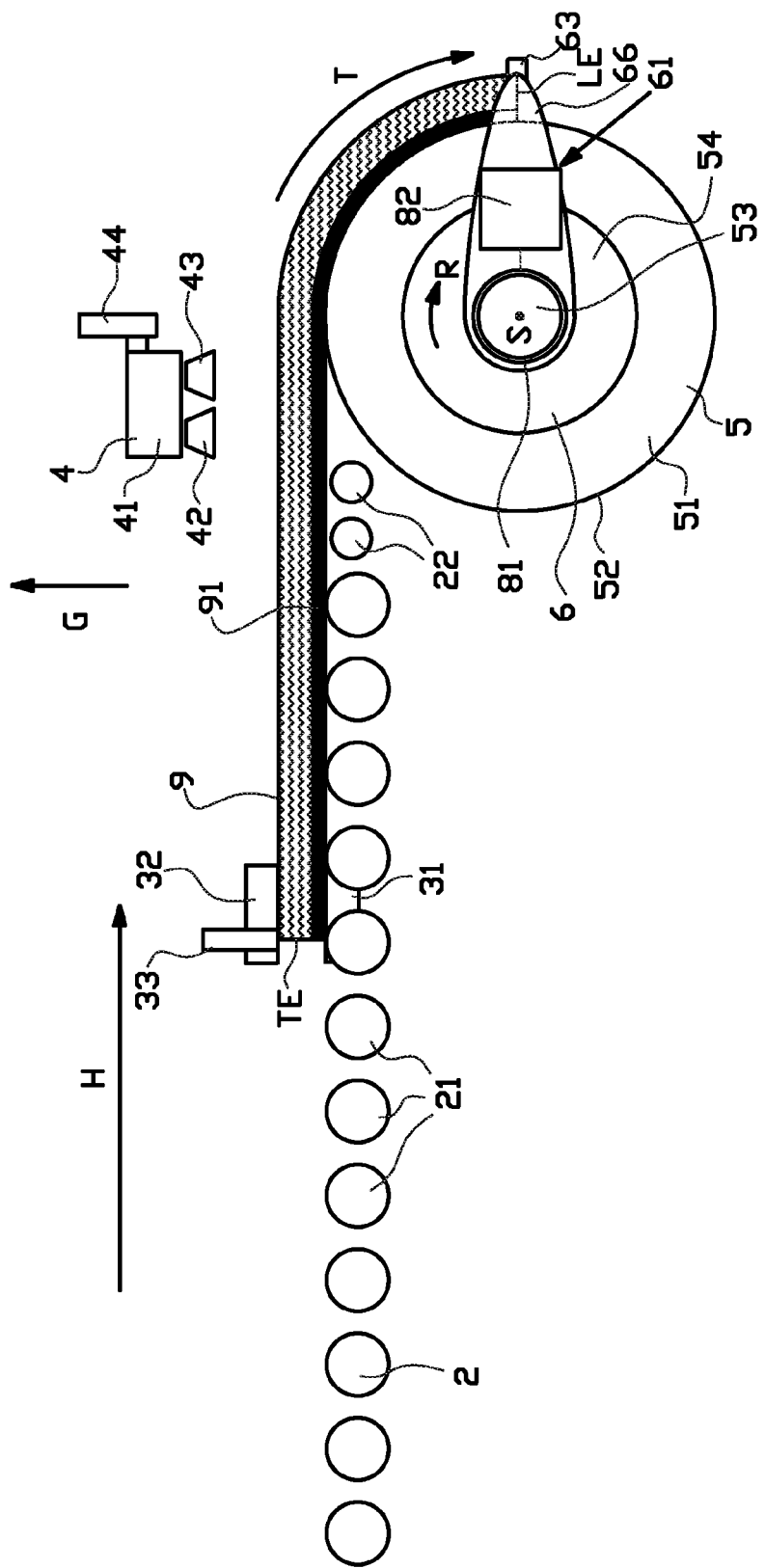

As shown in FIG. 6, the object 5 has been driven in a driven rotation R about the axis of rotation S to pull the leading end LE of the tyre layer 9 around the circumferential surface 52 of the object 5. As soon as the object 5 starts rotating, measurement signals from the first measuring unit 81, 82 and/or the second measuring 83, 84 are send to the calculation unit. As the tyre layer 9 is pulled around the object 5, the retaining device 3 starts to follow the corresponding movement of the trailing end TE of the tyre layer 9. In FIG. 6, the retaining device 3 has already moved over a distance along the roller conveyor 2. During the movement of the retaining device 3, a measurement signal indicative of the displacement of the retaining device 3, and thus of the leading end displacement H, is send to the calculation unit.

The various measurement signals can be used to control the rate of the driven rotation R, the rate at which the retaining device 3 follows the driven rotation R and/or the rate at which the retaining device 3 follows the tracking rotation T. Each use is described in more detail hereafter.

The measurement signal indicative of the driven rotation R and the measurement signal indicative of the tracking rotation T can be compared by the calculation unit. Any difference in the tracking rotation T with respect to the driven rotation R is indicative of a difference in the rate at which the leading end LE of the tyre layer 9 and the object 5 have rotated. Such a discrepancy can be caused by slipping or a backlash of the leading end LE of the tyre layer 9 over the circumferential surface 52 of the object 5, or a deformation of the object 5 itself. Due to the difference in the angular displacements, the leading end LE of the tyre layer 9 will not necessarily have completed a full revolution after a full revolution of the object 5. To compensate for the discrepancy, the calculation unit is connected to the drive of the object 5 and is arranged for, based on the calculated difference, sending a control signal to the drive to rotate the object 5 about the axis of rotation S over approximately a full revolution plus the calculated difference.

The measurement signal indicative of the driven rotation R and the measurement signal indicative of the leading end displacement H can be compared by the calculation unit to determine the rate at which the tyre layer 9 should be retained by the retaining device 3 in order to achieve the required amount of the stretching of the tyre layer 9. The calculation unit is connected to the retaining device 3 and is arranged for sending a control signal to the retaining device 3 for controlling the leading end displacement H of the trailing end TE of the tyre layer 9 in a specific rate to the measurement signal indicative of the driven rotation R. Theoretically, the rate should be approximately $\frac{1}{360}$ part of the initial length L of the tyre layer 9 per degree of driven rotation R of the object 5. As $\frac{1}{360}$ part of the initial length L of the tyre layer 9 is less than the angular displacement caused by a degree of the driven rotation T, the tyre layer 9 will be stretched accordingly.

The rate can be adjusted pro rata of the remaining length L of the tyre layer 9 to be applied and the remaining driven rotation R to be made. For example, if only halve of the length L of the tyre layer 9 remains to be applied and the object 5 is rotated already over 200 degrees, the remaining driven rotation R to be made is 160 degrees. The rate will be $\frac{1}{160}$ part of the remaining length L of the tyre layer 9 to be applied per degree of the remaining driven rotation R.

In practice however, the driven rotation R of the object 5 does not necessarily correspond to the actual angular displacement of the leading end LE of the tyre layer 9, as illustrated before when adjusting the driven rotation R based on the measurement signal indicative of the tracking rotation T.

Therefore, in a preferred embodiment, the measurement signal indicative of the tracking rotation T is used instead of the measurement signal indicative of the driven rotation R. By comparing the measurement signal indicative of the tracking rotation T to the measurement signal indicative of the trailing end displacement H, the calculation unit can precisely determine the rate at which the tyre layer 9 should be retained by the retaining device 3 in order to achieve the required amount of the stretching of the tyre layer 9. The calculation unit then sends a control signal to the retaining device 3 for controlling the leading end displacement H of the trailing end TE of the tyre layer 9 in a specific rate to the measurement signal indicative of the tracking rotation T. The required rate is approximately $\frac{1}{360}$ part of the initial length L of the tyre layer 9 per degree of tracking rotation T of the tracking device 6. As $\frac{1}{360}$ part of the initial length L of the tyre layer 9 is less than the angular displacement caused by a degree of the tracking rotation T, the tyre layer 9 will be stretched accordingly.

As illustrated before, the rate can be adjusted pro rata of the remaining length L of the tyre layer 9 to be applied and the remaining driven rotation R to be made.

Figure 7:
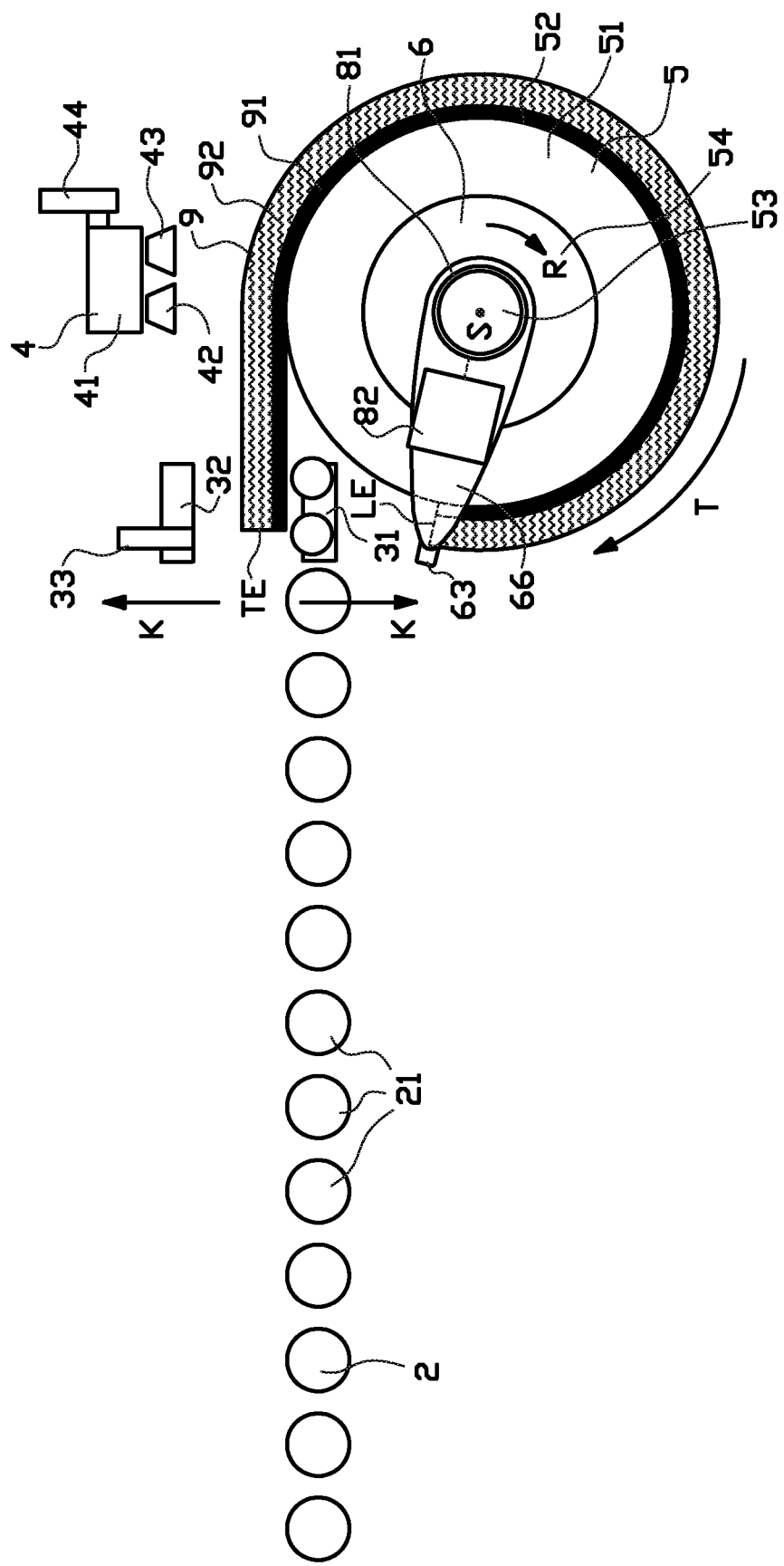

FIG. 7 shows the situation wherein the object 5 has almost completed a full revolution about the axis of rotation S. At this moment, the gripping members 31, 32 of the retaining device 3 are driven apart in a releasing direction K to release the trailing end TE of the tyre layer 9.

Figure 8:
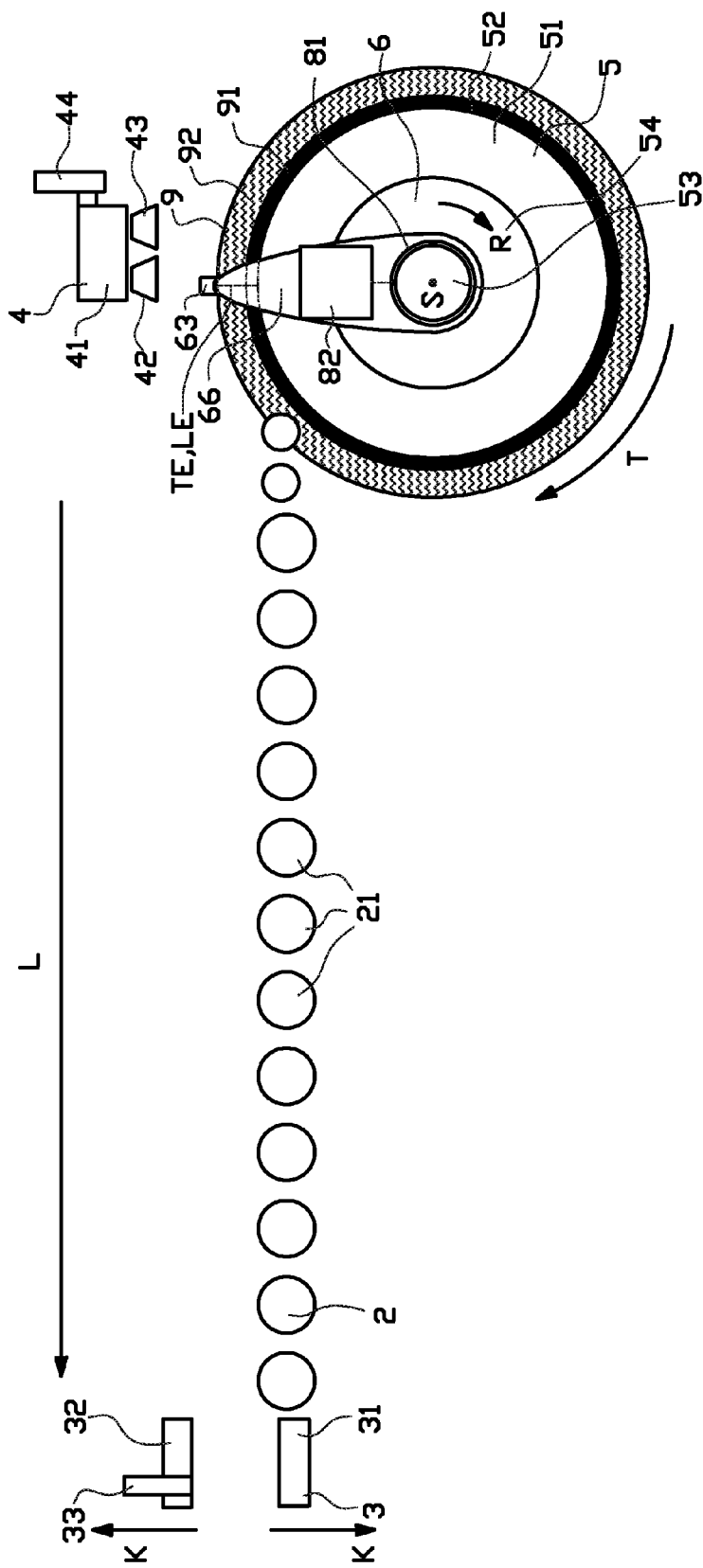

In FIG. 8, the situation is shown in which the retaining device 3 is returned upstream in the return direction L to prepare for a next cycle. The object 5 is rotated further to pull the tyre layer 9 fully around the circumferential surface 52. Preferably, any discrepancy between the tracking rotation T and the driven rotation R is compensated to ensure that the leading end LE and the trailing end TE of the tyre layer 9 will meet, so that they can be spliced together.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A tyre layer application assembly for applying a tyre layer around a substantially circular circumferential surface of an object, wherein the assembly is provided with a drive which, during application, is coupled to the object for driving the object in a driven rotation about a concentric axis of rotation with respect to said circumferential surface, wherein the assembly comprises a tracking device which, during application, is arranged to be fixed to a part of the tyre layer that is applied to the circumferential surface, wherein the tracking device is rotatable in a tracking rotation about the axis of rotation of the object, independent of the driven rotation of the object about the same axis of rotation.

2. The tyre layer application assembly according to claim 1, wherein, in the event of an angular displacement of the part of the tyre layer to which the tracking device is fixed with respect to the circumferential surface of the object, the tracking device is independently rotatable about the axis of rotation of the object with respect to the driven rotation of the object about the same axis of rotation.

3. The tyre layer application assembly according to claim 1, wherein the tracking device is jointly rotatable about the axis of rotation of the object with the part of the tyre layer to which it is fixed.

4. The tyre layer application assembly according to claim 1, wherein the tyre layer has a leading end which, during application, is the first part of the tyre layer to be applied to the circumferential surface, wherein the tracking device is fixed to the tyre layer at or near the leading end.

5. The tyre layer application assembly according to claim 1, wherein the assembly comprises a calculation unit and wherein the assembly further comprises:
a first measuring unit which is arranged for measuring the tracking rotation of the tracking device about the axis of rotation and for sending a measurement signal indicative of the tracking rotation to the calculation unit; and/or
a second measuring unit which is arranged for measuring the driven rotation of the object about the axis of rotation and for sending a measurement signal indicative of the driven rotation to the calculation unit.

6. The tyre layer application assembly according to claim 5, wherein the assembly comprises both the first measuring unit and the second measuring unit, wherein the calculation unit is connected to the drive and is arranged for calculating the difference between the tracking rotation and the driven rotation based on the measurement signals received from the measurement units, and for sending a control signal to the drive to rotate the object about the axis of rotation over approximately a full revolution plus the calculated difference.

7. The tyre layer application assembly according to claim 1, wherein the tyre layer has a trailing end which, during application, is the last part of the tyre layer which is to be applied to the circumferential surface, wherein the assembly is provided with a retaining device which holds or retains the trailing end during application.

8. The tyre layer application assembly according to claim 5,
wherein the tyre layer has a trailing end which, during application, is the last part of the tyre layer which is to be applied to the circumferential surface, and the assembly is provided with a retaining device which holds or retains the trailing end during application; and
wherein the tyre layer application assembly is arranged for controlling the displacement of the retaining device to control the displacement of trailing end during application, wherein the calculation unit is connected to the retaining device and is arranged for sending a control signal to the retaining device for controlling the trailing end displacement in a specific rate to the measurement signal indicative of the tracking rotation; or
wherein the tyre layer application assembly is arranged for controlling the displacement of the retaining device to control the displacement of trailing end during application, wherein the calculation unit is connected to the retaining device and is arranged for sending a control signal to the retaining device for controlling the trailing end displacement in a specific rate to the measurement signal indicative of the driven rotation.

9. The tyre layer application assembly according to claim 8, wherein the rate is approximately $\frac{1}{360}$ part of the length of the tyre layer per degree of the tracking rotation or the driven rotation, respectively, or pro rata to the remaining length of the tyre layer that is yet to be applied and the remaining tracking rotation or the remaining driven rotation, respectively, that is yet to be made.

10. The tyre layer application assembly according to claim 1, wherein the assembly comprises a shaft onto which the object is rotatably supported at its axis of rotation and a bearing for rotatably supporting the tracking device with respect to the shaft about the axis of rotation of the object.

11. The tyre layer application assembly according to claim 10, wherein the bearing rotatably couples the tracking device to the shaft.

12. The tyre layer application assembly according to claim 10, wherein the bearing is concentric with respect to the shaft onto which the object is supported.

13. The tyre layer application assembly according to claim 10, wherein the tracking device comprises at least one arm which is coupled to the bearing and extends radially outwards with respect to the circumferential surface of the object towards the tyre layer, wherein the tracking device is provided with a fixing body which is coupled to the arm at or near the circumferential surface, wherein the fixing body, during application, is arranged to be fixed to the tyre layer.

14. The tyre layer application assembly according to claim 13, wherein, considered in the rotational direction of the arm about the axis of rotation, the fixing body and the arm form a rigid unity.

15. The tyre layer application assembly according to claim 13, wherein the fixing body is coupled to the arm via guide that allows for translation of the fixing body in the radial direction with respect to the arm, wherein the tracking device is provided with a biasing member which biases the fixing body to move in a radially inward direction with respect to the axis of rotation towards the circumferential surface of the object.

16. The tyre layer application assembly according to claim 1, wherein the tracking device is arranged to be fixed to the tyre layer by clamping, tagging, adhering and/or gripping.

17. The tyre layer application assembly according to claim 13, wherein the fixing body is provided with a clipping bar, wherein, during application, the clipping bar is arranged to be pressed against the tyre layer to clamp the tyre layer on the circumferential surface.

18. The tyre layer application assembly according to claim 1, wherein the object is an empty drum, a drum with one or more other tyre layers already applied to it or a tyre.

19. The tyre layer application assembly according to claim 18, wherein the circumferential surface is formed by the circumferential surface of the empty drum, the circumferential surface of the other tyre layers applied to the drum, the circumferential surface of the tyre, the buffed circumferential surface of the tyre or the stripped circumferential surface of the tyre.

20. The tyre layer application assembly according to claim 19, wherein the tyre layer to be applied to the circumferential surface is a tread.

21. A method for applying a tyre layer around a substantially circular circumferential surface of an object, wherein the method comprises the steps of:
driving the object in driven rotation about an axis of rotation;
applying a part of the tyre layer to the circumferential surface of the object;

fixing a tracking device to the part of the tyre layer that is applied to the object; and rotating the tracking device with the part of the tyre layer to which it is fixed in a tracking rotation about the axis of rotation of the object, independent of the driven rotation of the object about the same axis of rotation.

22. The method according to claim 21, wherein, in the event of an angular displacement of the part of the tyre layer to which the tracking device is fixed with respect to the circumferential surface of the object, the tracking rotation is independent of the driven rotation.

23. The method according to claim 21, wherein the tracking device is jointly rotated about the axis of rotation of the object with the part of the tyre layer to which it is fixed.

24. The method according to claim 21, wherein the tracking rotation is continuously measured during the application of the tyre layer.

25. Method according to claim 21, wherein the method comprises the steps of measuring the tracking rotation and the driven rotation, calculating the difference between the tracking rotation and the driven rotation, and controlling the driven rotation to rotate the object about the axis of rotation over approximately a full revolution plus the calculated difference.

26. Method according to claim 21, wherein the tyre layer has a trailing end which, during application, is the last part of the tyre layer which is to be applied to the circumferential surface, wherein the method comprises the steps of:

measuring the tracking rotation and controlling the trailing end displacement in a specific rate to the measured tracking rotation; or measuring the driven rotation and controlling the trailing end displacement in a specific rate to the measured driven rotation.

27. Method according to claim 26, wherein the rate is approximately $1/360$ part of the length of the tyre layer per degree of the tracking rotation or the driven rotation, respectively, or pro rata to the remaining length of the tyre layer that is yet to be applied and the remaining tracking rotation or the remaining driven rotation, respectively, that is yet to be made.

* * * * *